United States Patent [19]
Brundiek

[11] Patent Number: 5,244,157
[45] Date of Patent: Sep. 14, 1993

[54] AIR FLOW ROLLING MILL

[75] Inventor: Horst Brundiek, Kaarst, Fed. Rep. of Germany

[73] Assignee: Loesche GmbH, Dusseldorf, Fed. Rep. of Germany

[21] Appl. No.: 805,988

[22] Filed: Dec. 12, 1991

Related U.S. Application Data

[63] Continuation-in-part of Ser. No. 543,862, Jun. 26, 1990, abandoned.

[30] Foreign Application Priority Data

Jul. 4, 1989 [DE] Fed. Rep. of Germany ....... 3921986

[51] Int. Cl.⁵ .............................. B02C 25/00
[52] U.S. Cl. ....................... 241/36; 241/37; 241/119; 241/121
[58] Field of Search ............... 241/117-121, 241/37, 36

[56] References Cited

U.S. PATENT DOCUMENTS

| | | |
|---|---|---|
| 676,982 | 6/1901 | Erfurth . |
| 3,591,094 | 7/1971 | Gauer ........................ 241/121 X |
| 4,489,895 | 11/1971 | Petersen . |
| 4,640,464 | 2/1987 | Musto et al. ................. 244/119 X |
| 4,796,817 | 1/1989 | Zacher ........................ 241/119 X |
| 4,869,434 | 9/1989 | Folsberg .................... 241/119 X |
| 4,981,269 | 1/1991 | Koga et al. . |

FOREIGN PATENT DOCUMENTS

| | | |
|---|---|---|
| 173065 | 3/1986 | European Pat. Off. . |
| 2019005 | 11/1971 | Fed. Rep. of Germany . |
| 205079 | 12/1983 | Fed. Rep. of Germany . |

Primary Examiner—Mark Rosenbaum
Assistant Examiner—Frances Chin
Attorney, Agent, or Firm—Keck, Mahin & Cate

[57] ABSTRACT

The invention relates to an air flow rolling mill for comminuting hard minerals such as slag or cement clinker. The discontinuities in operation occurring with high fineness levels are overcome in that with the grinding rollers are associated compression rollers for making the grinding bed uniform.

17 Claims, 7 Drawing Sheets

AIR FLOW ROLLING MILL

RELATED APPLICATION

This application is a continuation-in-part of Ser. No. 07/543,862, filed Jun. 26, 1990, now abandoned.

The invention relates to an air flow, stream or current rolling mill with several stationary, rotatable grinding rollers, which are resiliently pressable against a driven grinding tray rotating about a rotation axis by a grinding bed formed by grinding material to be comminuted.

Figure 1:
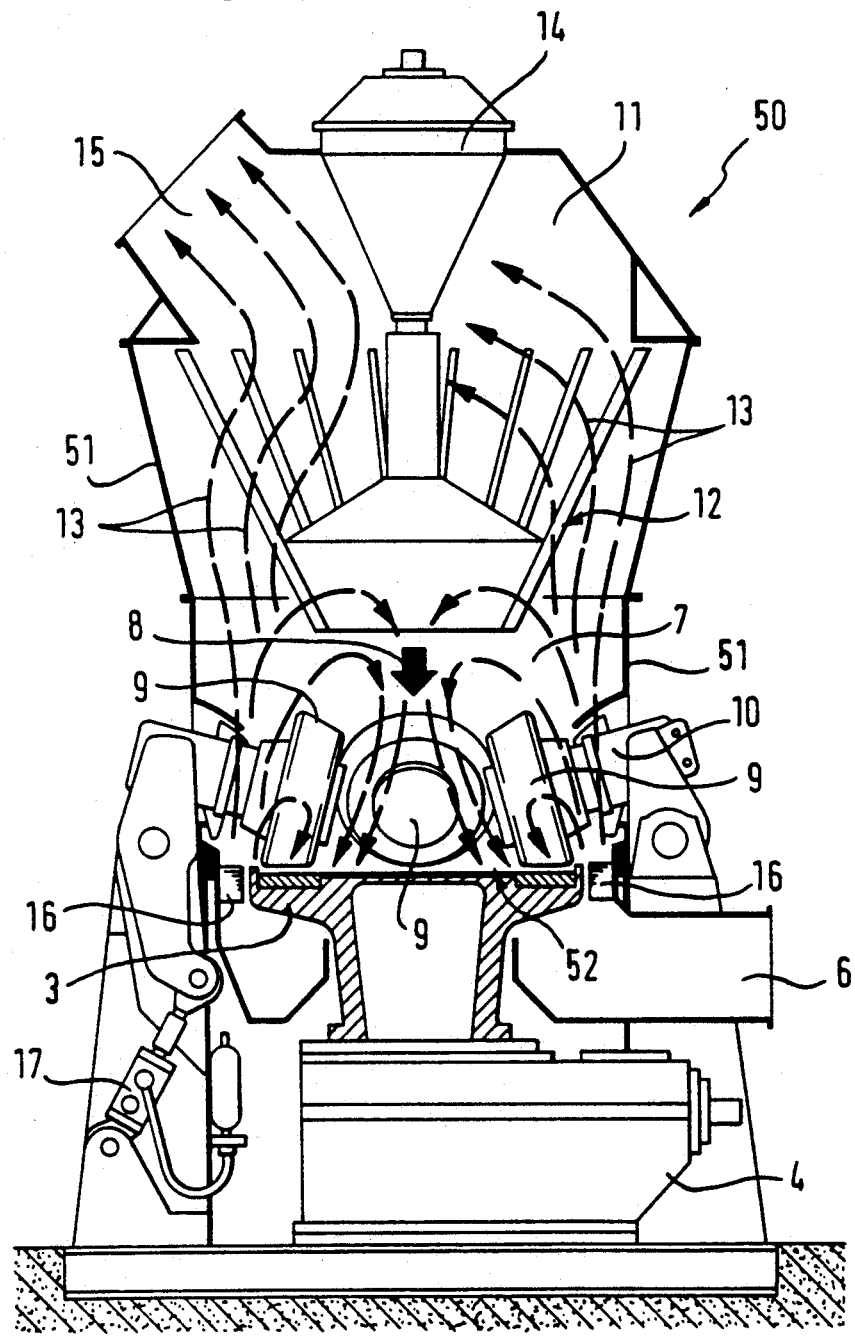

Such an air flow rolling mill is e.g. known from German patent 20 19 005 and EP 0 173 065 A2 and is shown in FIG. 1.

To illustrate the problems occurring in said known air flow grinding mills, such a mill 50 and its essential subassemblies and their operation will now be briefly described.

The air flow rolling mill 50 standing on a foundation or base is surrounded generally in air tight manner by a casing 51. The complete grinding installation comprises a lower rolling mill 52 over which an integrated sifter 11 is installed in the upper area. The sole subassembly of the rolling mill 52 the grinding tray 3 is rotated by means of a drive 4. The grinding material supplied from above or the side to the grinding tray 3 is comminuted between the resiliently pressed together grinding rollers 9 and the grinding tray 3. The resilient pressing can e.g. take place by means of a rocker 10 and a hydraulic cylinder means 17 cooperating therewith. The grinding rollers 9 do not normally have a separate drive and are instead rotated solely by frictional engagement with the grinding tray or the grinding material bed present thereon. The air flowing in a via the supply duct 6 and the vane ring 16 delivers the mixture of fine and coarse grain material hurled away from the grinding tray 3 after it has been rolled over by the grinding rollers 9 upwards into the vicinity of the sifter 11. By means of the rotor 12 driven by its own rotor drive 14 and in accordance with the rotation and the rising volume flow of the air-dust mixture 13, oversize material is rejected, so that it drops back together with a partial air flow onto the grinding tray 3 in the vicinity of a so-called eddy sink 8. The fine material leaves the sifter 11 in the upwards direction via the fine material outlet 15.

The flow conditions regarding the air-dust mixture which normally occur are indicated as broken flow lines in FIG. 1. As is clear, below the sifter rotor 12 a sink 8 formed in the centre of the rolling mill and in it not only are grinding material particles, but also air or gas returned downwards virtually in circuit form to the grinding tray 3. This air-dust mixture is drawn in by the grinding rollers 9, which roll over the same and the air naturally escapes.

Clearly the flow conditions within the inner area 7 of the air flow rolling mill 50 are highly dependent on the desired product fineness. In the case of standard designs of such grinding installations, such as are used in crushing hard materials in the grinding of coal and cement raw materials, on average a dust is produced which has a fineness of approximately 10 to 35% R DIN 0.09.

If it is wished to produce with the air flow rolling mill 50 a much finer dust than 10% R DIN 0.09, the oversize material rejected by the sifter also becomes much finer. As the aerodynamic lift of the finest grit in the air is higher than that of the coarse grit, there is consequently also a reduction in the gravity fraction, which returns the oversize material to the grinding tray 3. This means that an extremely highly aerated "dust cloud" drops back or is returned to the grinding tray 3. As a result of a very low internal friction this dust cloud can be compared physically with a liquid.

When grinding very hard and brittle, as well as dry products, such as slag and cement clinker, experience has shown that the most economic production of these grinding products in the fine range appropriately takes place with a much higher specific grinding force than was hitherto conventional for materials such as limestone, cement raw material and coal. The problem arises that on the one hand a very strongly aerated grinding bed builds up on the grinding tray 3 and must be retained and on the other hand that said aerated grinding bed must be comminuted with the aid of very high specific forces. The drawing in of the highly aerated grinding material frequently leads to a slip-stick effect. The highly aerated grinding material is initially dammed back in front of the grinding rollers, the air being displaced from the dust-air mixture. Thus, upstream of the grinding rollers a continuously growing dust wave is formed and this could be compared with the bow wave of a ship.

As the grinding rollers are driven and entrained only frictional engagement with the grinding bed or material, said necessary coupling medium with respect to the grinding rollers is only adequately stable again when sufficient air has been removed from the dust-air mixture of the highly aerated grinding bed. To the latter problem must be added the phenomenon that through a longer damming up of such a growing dust wave rapidly a type of dust wedge is built up in front of the grinding rollers. This unavoidably leads to the further problem of speedily and continuously drawing the grinding bed under the flexible grinding rollers. As a result of these physical conditions the speed of the grinding rollers drops or they can even stop altogether, so that they are struck in a jerky manner by the dammed up dust wedge and then have to be accelerated again up to their average speed.

The aforementioned disadvantages and functional sequences lead to the slip-stick effects on the grinding rollers, which are manifested by strong mill vibrations. Apart from the mechanical damage which can occur as a result of the said sliding and blocking effect on the air flow rolling mill, in the case of this discontinuous operation of the complete installation, the mill throughput is also impaired and reduced.

In addition to the aforementioned problems, when comminuting very hard materials to extreme finenesses, the additional problem occurs that the grinding bed formed discontinuously as a result of the slip-stick effects may be subject to tearing apart through the necessary high specific grinding pressures.

Moreover, East German patent 205 079 discloses a method and an apparatus for increasing the throughput and saving energy in rolling mills for destroying the packing structure of compacted grinding material and regrouping and whirling up the same. The ground finished product is discharged by a sifting air flow from the horizontally rotating grinding ring. The grinding material is supplied through the rotating grinding bodies behind which a fixed scraper made from wear-resistant material is fitted rigidly or in spring-loaded manner in such a way that the grinding bed is raised and whirled up from the grinding ring. In place of the scraper it is possible to fit in a rigid or spring-loaded manner a stationary, rotary roller. However, the latter rotates at a different circumferential speed to the grinding ring in order to bring about a tearing apart of the grinding bed.

The aim of this prior art is to avoid the increasing compaction of the grinding material in the case of comminution processes in rolling mills.

On the basis of these disadvantages of the prior art the object of the present invention is to so design an air flow rolling mill that it makes possible a more uniform functional sequence and therefore a higher efficiency for high fineness levels of the grinding material, the grinding bed being built up as uniformly as possible and a breaking up is largely avoided at the necessary high pressures.

According to the invention this object is achieved in that with the grinding rollers is additionally associated at least one precompression device for rendering uniform the grinding material supplied to the following grinding roller.

An essential idea of the invention is that in such an air flow grinding mill in addition to the grinding rollers, which can also be referred to as working rollers, a precompression device for rendering the grinding bed uniform. Advantageously upstream of each grinding roller is provided such a precompression device, so that the "bow wave" of the airdust mixture upstream of the grinding roller can be prevented and simultaneously the grinding bed is homogenized to give an uniform thickness prior to supply to the grinding roller. The precompression device is appropriately a compression roller, which is conventionally positioned between two grinding rollers and which can also be referred to as a smoothing roller. Unlike the grinding roller, which is subject to a force, particularly by a spring mechanism for producing the high grinding pressures, the compression roller is solely pressed onto the grinding bed by its own weight and possibly a spring damping system, so that without producing vibrations and only via the coupling medium of the grinding material it rolls along driven by friction. Thus, the compression roller normally carries out no comminuting work.

The additional cost of the compression rollers is compensated by the fact that they additionally assume responsibility for aerating the grinding bed and smooth the latter. This is mainly due to the low bearing force of the smoothing rollers, because they do not have a tendency to dam up the aerated grinding bed in the manner of a "bow wave" and then possibly tear the same by a shoving effect.

Thus, the grinding rollers which carry out the actual comminution are supplied with a grinding bed ideally prepared for this purpose. Preliminary tests in which two rollers were freed from their standard spring loading for producing the high grinding pressures and which were then allowed to roll on the grinding bed only under their own weight, revealed that in conjunction with two spring-loaded grinding rollers there was even a partial increase in the air flow rolling mill throughput. This is even more surprising in that the rollers freed from their spring loading and now serving as compression rollers performed no grinding. Therefore the frictional and braking forces with respect to the rotating grinding tray were reduced and in particular it was possible to considerably reduce the layout for the hitherto necessary peak capacities through partial jerky operation.

Thus, the invention provides the constructional and economic possibility of halving the numbers of spring-loaded grinding rollers used for the grinding capacity and to associate therewith an equal number of much lighter and less expensive compression rollers. Thus, in the extreme case it is possible to provide on a grinding tray one grinding or working roller together with one compression roller. However, the number of rollers generally exceeds this, but advantageously with each grinding roller is associated a compression roller.

With this constructional layout the force and throughput dimensioning of said air flow rolling mills need only take place with the aid of the effect of the grinding rollers, said effectiveness being increasable by a factor of roughly two as a result of the grinding bed prepared by the compression rollers.

Since, as a function of the specific use conditions and the grinding material, the diameters of the rollers can differ widely, in part compression rollers can be used, which have 0.1 times the grinding roller diameter. However, smoothing rollers with a diameter up to twice that of the grinding rollers would be conceivable.

If a purely rolling movement of the compression rollers for homogenizing the grinding bed is considered suitable, the compression rollers with their rotation axis are oriented in such a way that their intersection points with the rotation axis of the grinding tray is in the grinding path plane. This avoids sliding and slipping movements of the smoothing rollers.

However, if it is intended to superimpose in planned manner a sliding movement on the rolling movement of the smoothing rollers, it is advantageous for the intersection point of the rotation axes of the compression rollers with the rotation axis of the grinding tray to be above or below the grinding path plane.

In place of compression rollers it would also be possible to use sliding shoes or similar means. However, it would then be necessary to accept a higher friction and higher driving power for the rolling mill.

With a view to a further improvement of the operation and whilst avoiding slip-stick effects, optionally the working or grinding rollers can be additionally equipped with a separate rotary drive, besides the grinding tray.

Thus, the inventive concept provides a method for the effective crushing of cement clinker or similar materials, in which the grinding material bed undergoes precompression or presmoothing prior to crushing. As has been experimentally shown, it is possible in this way to improve the efficiency of an air flow rolling mill with respect to the throughput of the ground material and the necessary energy requirements.

According to a particularly advantageous embodiment of the invention the speed of each precompression device, which will be referred to hereinafter as a compression roller for short, is to be adjusted in such a way that the rolling mill vibrations caused by the grinding process are at a minimum. These vibrations are mainly caused by the aforementioned slip-stick effects on the grinding rollers and are a measure for the action, i.e. the precompression of the compression rollers, the undesired mill vibrations normally assuming a minimum value if the compression of the grinding bed by the compression rollers prevents slip-stick effects on the grinding rollers. In order to set an optimum grinding operation, consequently the vibrating power is measured at a representative point of the rolling mill and the speed of the compression rollers, accompanied by the observation of the vibrating power, is adjusted in such a way that it assumes a minimum value. Preferably the vibrating power is determined in the form of the effective vibrating speed (mm/s) defined by VDI 2056 and an optimum operating speed of the particular compression roller is reached if the measured effective vibrating speed is at a minimum.

Before determining the compression roller speed as a function of a minimum vibrating value (vibrating power) of the air flow rolling mill, advantageously the compression roller or rollers are placed at a predetermined level above the grinding path surface, so that between the latter and the lowest point of the facing generatrix of the compression roller a gap is left. The resulting frictionally produced speed of the compression rollers in the presence of grinding material on the grinding trays constitutes a starting point for the above-described optimization of the compression roller speed to the value at which the measured vibrations of the rolling mill assume a minimum value. The optimization of the compression roller speed takes place via a setting of the gap between the compression roller and the grinding path surface and for this purpose devices are provided which permit a stepless adjustment of the gap size.

For example, there can be mechanical, pneumatic and hydraulic lifting devices. Preferably, for the aforementioned adjustment function, each compression roller is located on a supporting rocker, on which acts a controllable pivoting device.

With a view to the optimum gap setting between the compression roller or rollers and the surface of the grinding path or grinding disk, it has proved appropriate to provide the grinding trays with an all-round baffle rim or flange, whose height corresponds approximately to 0.1 to 0.2 times the grinding roller diameter. In this case half the baffle flange height represents the starting quantity for the gap starting from which the optimum operating speed of the compression roller is determined in the aforementioned manner.

Appropriately the arrangement of the compression roller, the compression roller mounting support, which can e.g. be in the form of a rocker, the cover and the gap setting device can be combined into a module which, as required, can be integrated into a rolling mill. To this end the aforementioned components are arranged on a supporting frame, so that the module is detachably connected to the rolling mill casing. Advantageously the compression roller is pivotably articulated to the rolling mill casing by means of an auxiliary joint, so that the compression roller is pivotable between a working position, in which the compression roller is pivoted in over the grinding tray, and a service position, in which the compression roller is pivoted out of the rolling mill casing. As a result service and maintenance work can be carried out on the compression roller module in a particularly simple way. As the grinding rollers are also pivotable between a working position over the grinding tray and a service position outside the rolling mill casing, preferably the distance between the median longitudinal axis of the rolling mill and the rotation axis of the grinding rollers and the compression rollers in the service position is made constructionally identical. Therefore it is possible to provide on a crane runway a hoisting unit positioned above the rollers and which, both for the working rollers and for the compression rollers, always maintains the same distance with respect to the mill centre.

Figure 2:
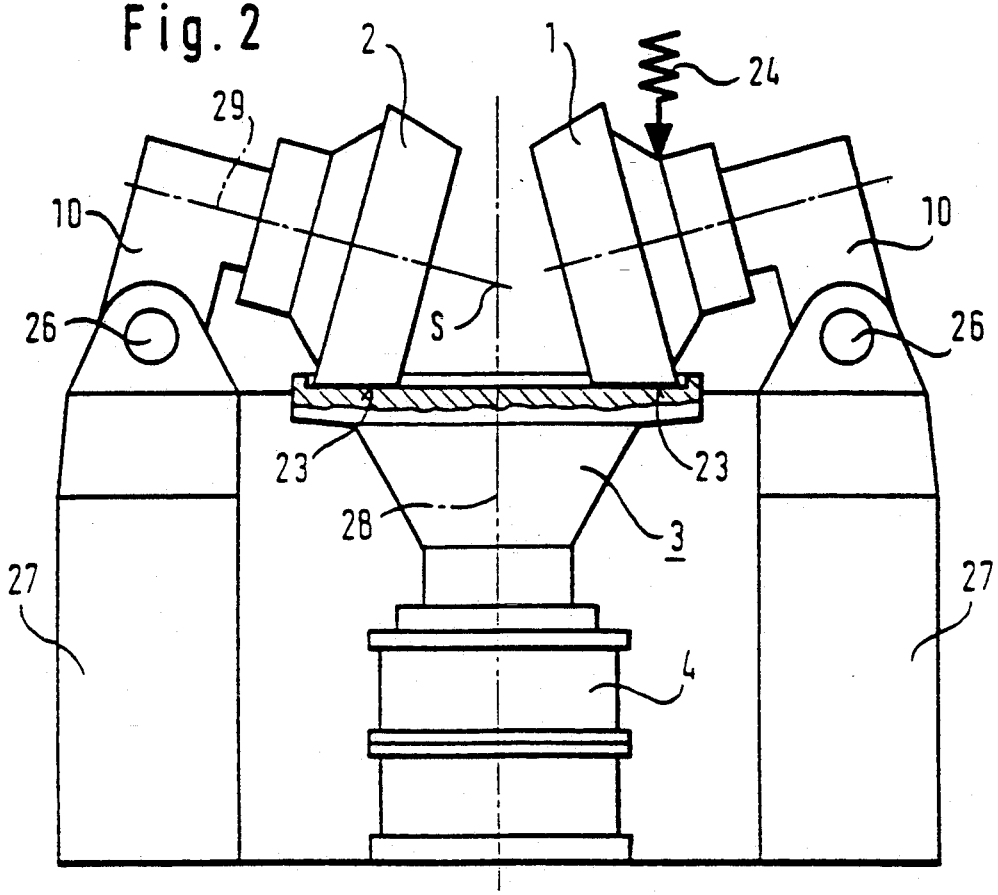
Figure 3:
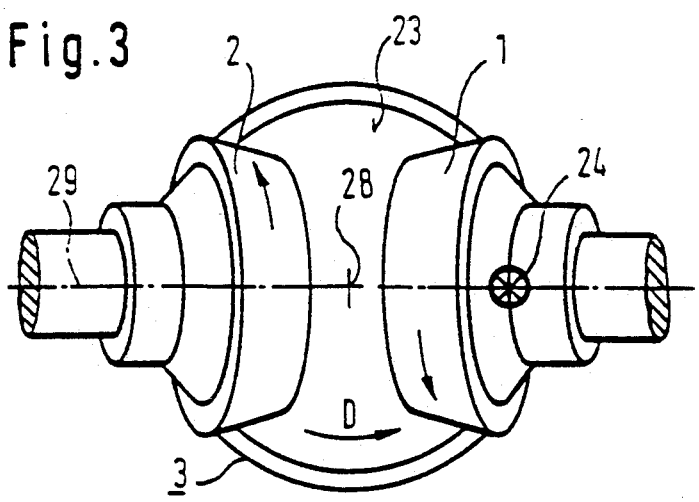
Figure 4:
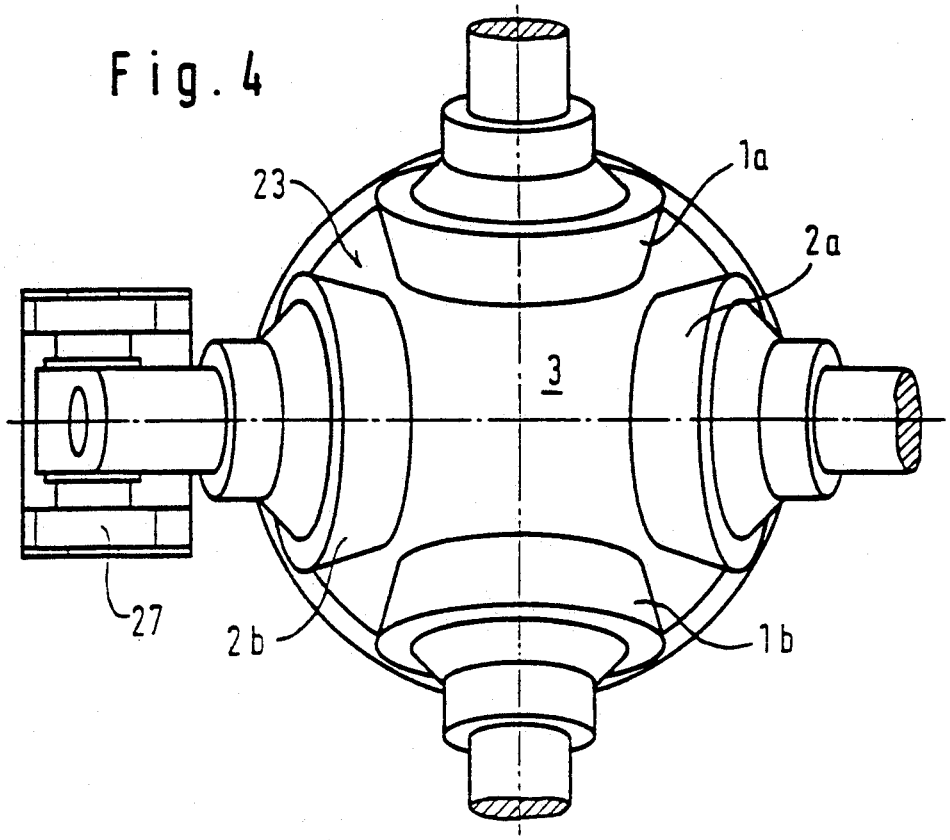
Figure 5:
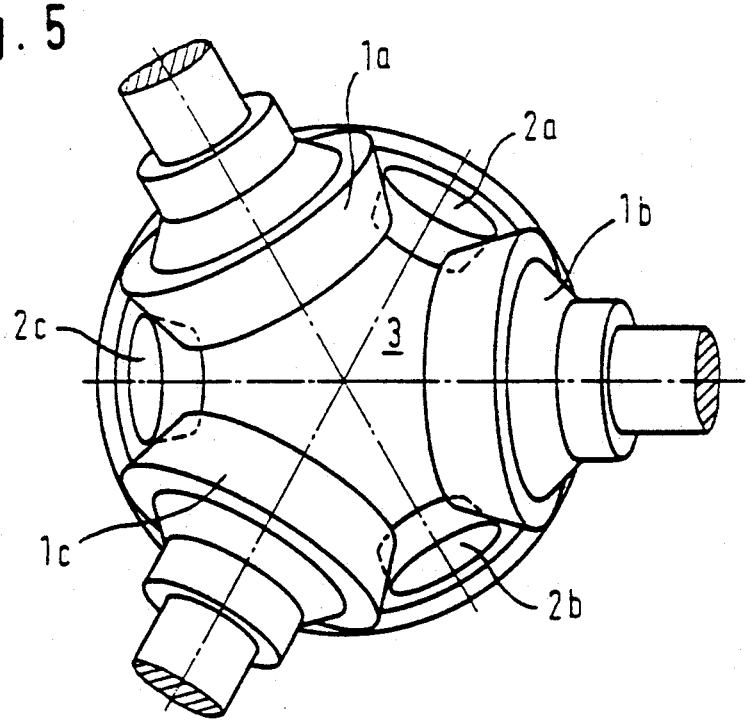
Figure 6:
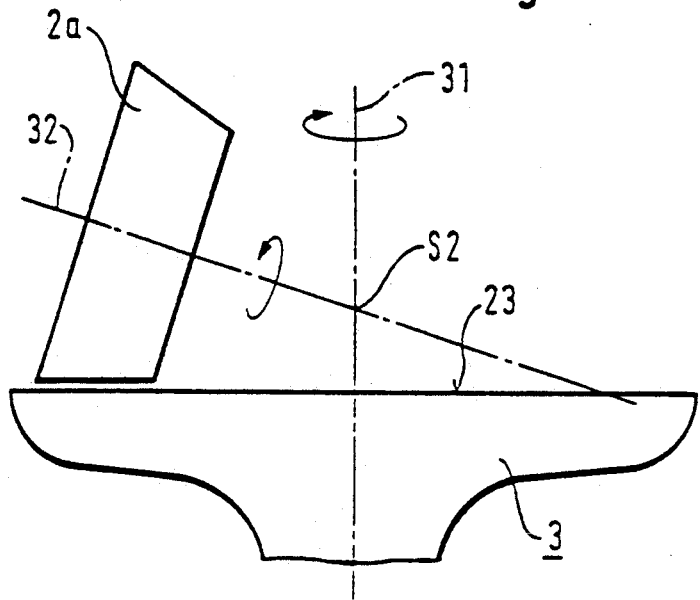
Figure 7:
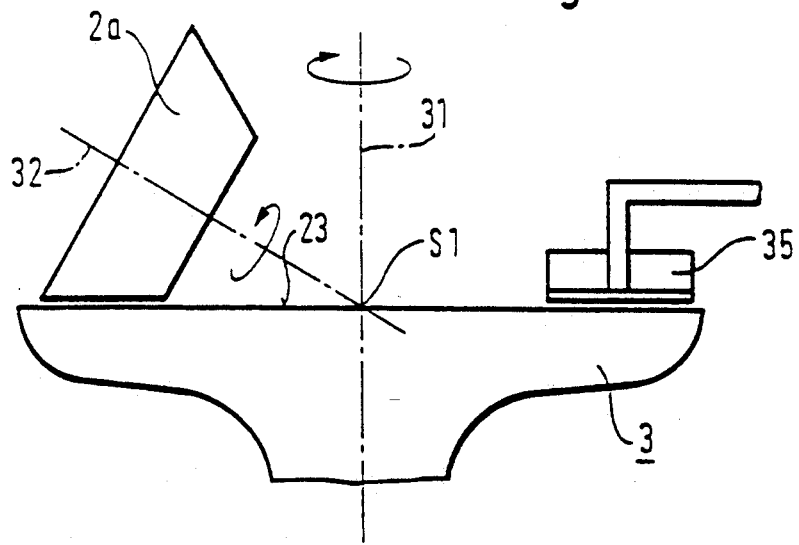
Figure 8:
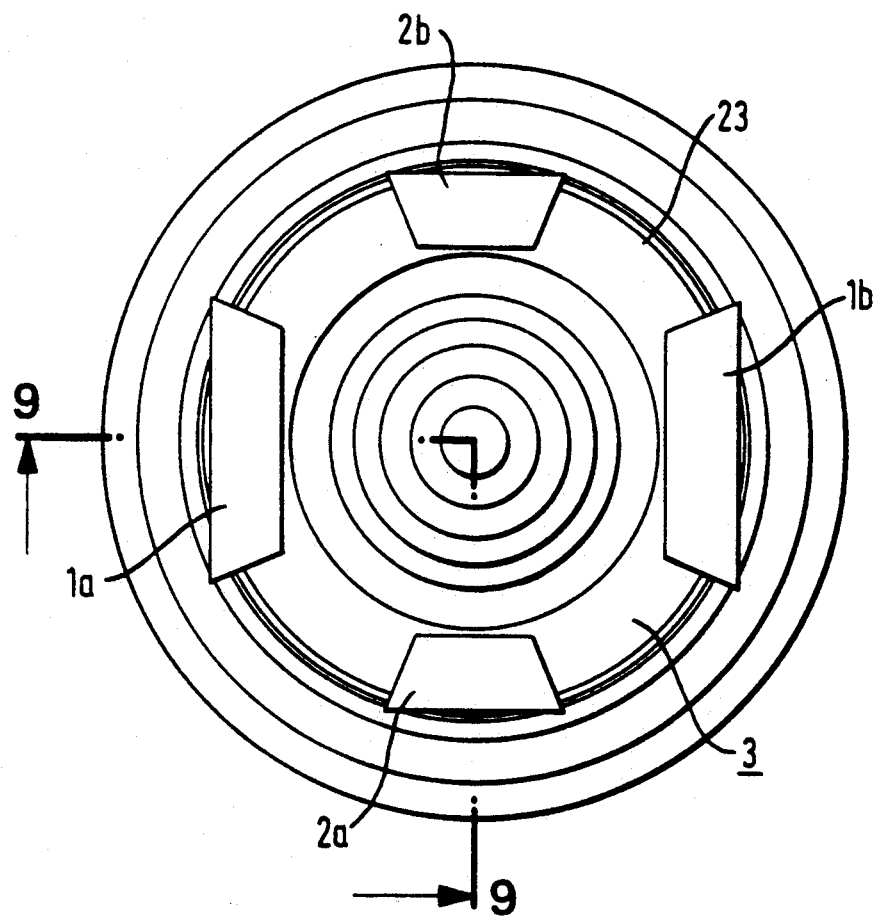
Figure 9:
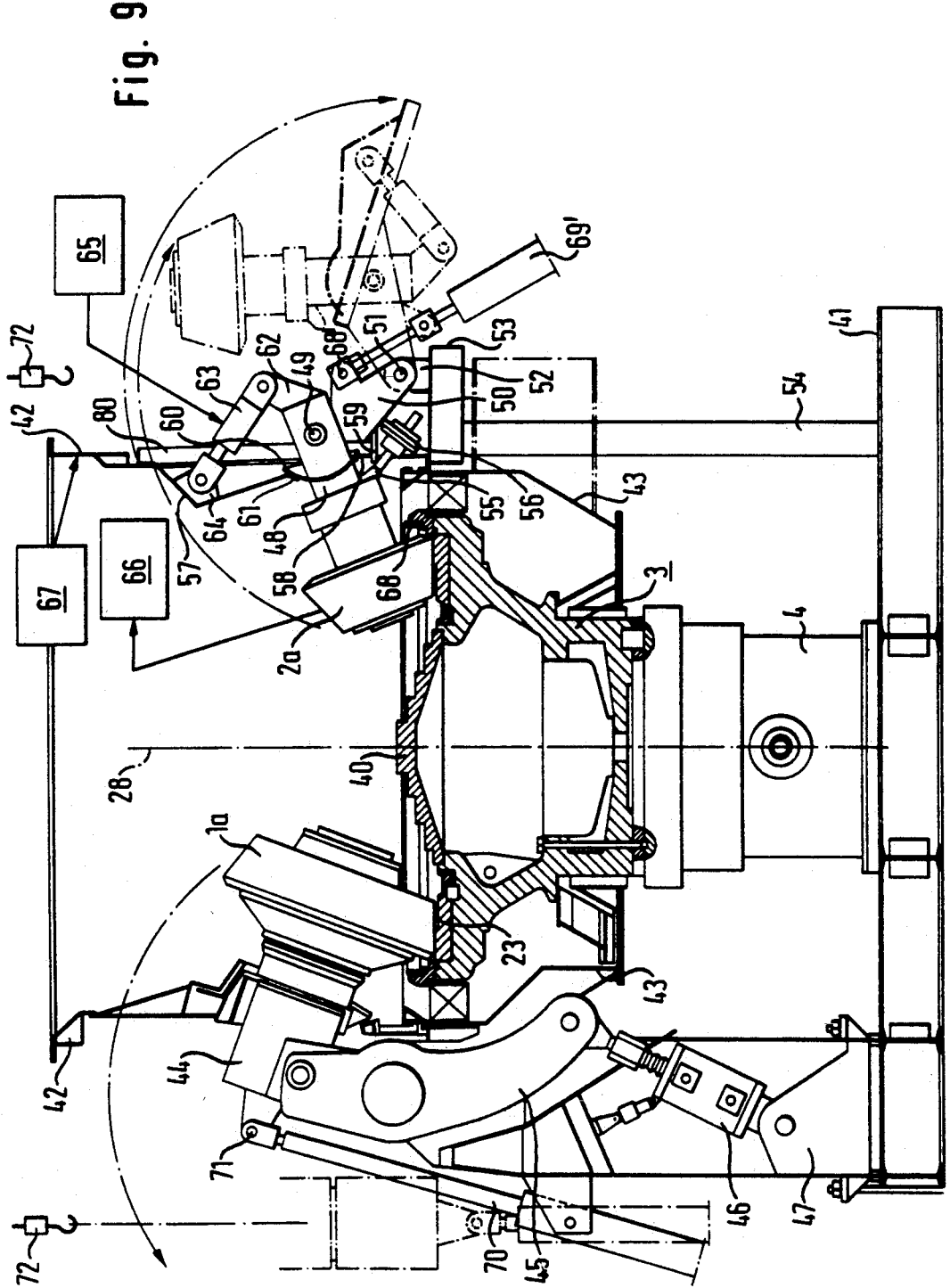
Figure 10:
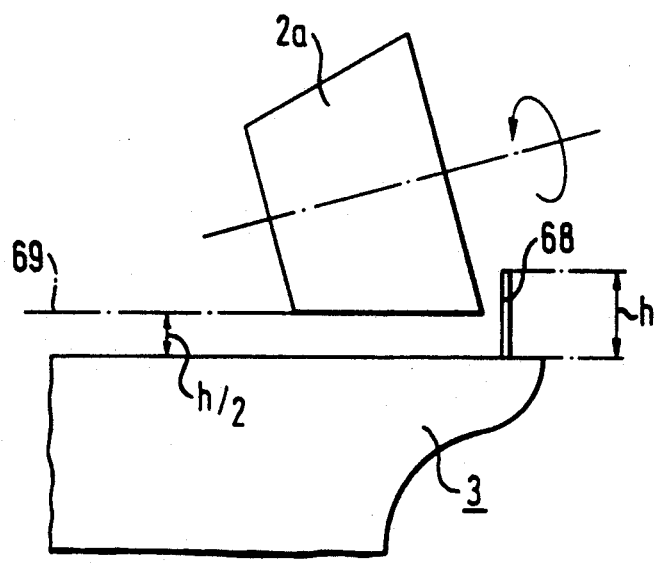

The invention is described in greater detail hereinafter, whilst taking account of the fundamental design of an air flow rolling mill, as described with respect to FIG. 1, relative to the drawings, wherein show:

FIG. 1 the basic construction of an air flow rolling mill;

FIG. 2 the diagrammatic representation of the vicinity of the mill with two rollers in side view;

FIG. 3 a plan view of the grinding tray according to FIG. 2;

FIG. 4 a plan view of another variant of the invention with two grinding rollers and two compression rollers;

FIG. 5 another variant of the invention in plan view on a grinding tray with three grinding rollers and three small compression rollers;

FIG. 6 a diagrammatic vertical section through a grinding tray with a compression roller arranged thereon and which performs a rolling and a smoothing movement;

FIG. 7 a comparable section to FIG. 6, but with an orientation of the compression roller for a pure rolling movement and in its right-hand part is also located a sliding shoe;

FIG. 8 a further variant of the invention in plan view of a grinding tray with two grinding rollers and two small compression rollers;

FIG. 9 a sectional view along arrows A—A in FIG. 8;

FIG. 10 a diagrammatic detail view of the compression roller of FIG. 9 in order to illustrate the setting of the gap between said roller and the grinding disk.

FIG. 2 is a side view of the part of a rolling mill without sifter 11 and surrounding casing 1 vital for the present invention. In the present embodiment the grinding tray 3 is rotated about its axis 20 by a drive 4.

By frictional engagement with the grinding material present on the surface a grinding roller 1 is rotated on grinding tray 3 in the vicinity of the radially outer material path 23, which can also be referred to as a grinding bed and opposite the same a compression roller 2 is rotated by frictional engagement. The compression roller as a precompression device can also be referred to as a smoothing roller.

The grinding roller 1 is subject to the action of a spring tension 24 from above, so that the desired comminuting pressure can be applied to the grinding bed 23. With reference to FIG. 1, such a tension can also be produced by a hydraulic cylinder means 17 arranged in the bearing support 27.

The rollers, i.e. both the grinding rollers 1 and the compression rollers 2, are mounted by means of a rocker 10 and a pivot pin 26 on corresponding bearing support 27.

In FIG. 1 the intersection S of the rotation axis 29 of the compression roller 2 with the rotation axis 28 is located above the grinding path plane. Thus, the compression roller 2 does not perform a pure rolling movement on the grinding tray 3 and instead a planned sliding movement is superimposed on said rolling movement.

With reference to FIG. 3, which partly shows the embodiment of FIG. 2 in plan view on the grinding tray 3, it is possible to see the rotation directions of the individual subassemblies indicated by the arrows. As a result of the frictional engagement of the rollers 1,2 with the grinding tray 3, which is driven in rotation direction D, this necessarily leads to the rotation direction of the rollers at 180° with respect thereto.

In a comparable manner to FIG. 3, FIG. 4 shows another embodiment with a total of four rollers. The two facing compression rollers 2a and 2b have roughly the same size as the two grinding rollers 1a and 1b. It is particularly significant that the width of the compression and grinding rollers 2a, 1a on the grinding path 23 is approximately the same in order to achieve the desired homogeneity of the grinding bed.

In the further embodiment of FIG. 5, which is deagrammatically a plan view of a grinding tray 3, smaller compression rollers 2a, 2b, 2c are arranged below much larger diameter grinding rollers 1a, 1b, 1c. The axes of the compression rollers and the rockers have been omitted for simplification reasons. However, it would also be possible under consideration of the size of the compression rollers to bring about fitting to the casing or an arrangement on the corresponding bearing support (FIG. 2) of the associated working roller.

FIG. 6 shows a compression roller 2a with its rotation axis 32. It is also possible to see the grinding tray 3 with an approximately horizontal surface of the grinding path 23, the grinding tray 3 rotating about its vertical rotation axis 31. As shown, the intersection S2 of the rotation axis 31 of the grinding tray 3 and the rotation axis 32 of the compression roller 2a is above the surface of the grinding path 23. This indicates that the compression roller 2a does not perform a pure rolling movement, because a sliding movement is superimposed thereon.

In a similar manner to FIG. 6, FIG. 7 shows the arrangement of a compression roller 2a on the grinding tray 3. However, in this case the intersection S1 between the rotation axis 32 of the compression roller 2a and the rotation axis 31 of the grinding tray is on the surface of the grinding path 23. This means that the compression roller 2a performs a pure rolling movement on the grinding tray 3 or the grinding path 23.

In the right-hand part of FIG. 7 is additionally shown a sliding shoe 35, which, in place of a compression roller, can carry out the precompression and smoothing of the grinding material prior to a following grinding roller. Obviously the sliding shoe 35 or compression rollers 2a are arranged by means of corresponding mounts on the casing of the air flow rolling mill.

Thus, the compression rollers eliminate the "bow wave" of the air-dust mixture, particularly in the case of high fineness levels, upstream of the associated grinding roller and the thickness of the grinding bed is rendered uniform, so that through avoiding discontinuities in the operating sequence a higher throughput of the complete installation can be achieved.

Another embodiment of the invention is shown in FIGS. 8 to 10, which is the essential part of a rolling mill in the vicinity of the grinding tray 3 without a sifter 11 and the surrounding casing 51.

FIG. 8 is a diagrammatic plan view of the grinding tray 3. By frictional engagement with the grinding material present on the surface in the vicinity of the radially outer grinding path 23, on the grinding tray 3 are rotated two diametrically facing grinding or working rollers 1a,1b as well as two diametrically facing compression rollers 2a, 2b. The grinding and compression rollers 1a,1b and 2a,2b are therefore arranged in alternately succeeding manner and the connecting axis of the grinding roll indicated in dot-dash line manner runs at an angle of 90° to the connecting axis of the compression roller pair also indicated in dot-dash form.

Details of this variant of the inventive air flow rolling mill can be gathered from FIG. 9, in which the grinding roller 1a faces the compression roller 2a along the section line A—A of FIG. 8. The grinding tray 2 is rotated about its axis 28 by a drive 4. Radially inwardly from the grinding path 23, the grinding tray 3 comprises a central, conical part 40. A foundation 41 is provided on which is mounted the grinding tray 3 with the drive 4. It is also possible to see an upper part of mill casing 42 as part of the rolling mill casing and in the lower area a casing for the air duct. As has already been described relative to FIG. 1, here again the grinding roller 1a is articulated by means of a rocker 44 and a pivotable lever 45 to a hydraulic cylinder arrangement 46, which is in turn connected by means of a bearing and a bearing block 47 to the foundation 41. The arrangement 46 is used for pressing in resilient manner the grinding roller 1a against the grinding path 23.

In the represented embodiment the compression roller 2a is also suspended in vibrating manner by means of a rocker 48, on whose end is mounted in per se known rolling manner the compression roller 2a, as can be gathered from the part sectional representation of the compression roller and the rocker. In the vicinity of its other, outwardly oriented end, the rocker 48 is mounted by means of a shaft 49 on a bearing lever 50, which is in turn pivotably mounted by means of a shaft 51 on a bearing block 52. The bearing block 52 is fixed to the foundation 41 by means of a support 53 and a post 54. The rocker 48 comprises a projecting support area 55, which engages with a mill casing-fixed stop 56, so that the maximum lowering depth of the compression roller 2a relative to the grinding path 23 is fixed. The stop 56 is positioned within the mill casing.

A support frame 80 is also provided, which with an upper portion 57 and a lower portion 58 as a casing cover forms part of the casing wall. The portions 57 and 58 are in tight engagement with the mill casing 42.

For the dustproof passage of the rocker 48 through an opening in the casing or portion 57 on said rocker is provided an arcuate segment 60, which is in tight engagement with a casing segment 61, which is fixed to the opening for the rocker 48 in the wall portion 57. The shape of the segment 60 could also be compared with the outer part of a "slice of tart".

On an extension 62 at the outer end of the rocker 48 is articulated a hydraulic cylinder arrangement 63, whose other, upper end engages on a bearing block 64, which is fixed to the portion 57. The hydraulic cylinder arrangement 63 forms part of a device for setting the distance or a gap between the surface of the grinding tray 3 in the vicinity of the grinding path 23 and the facing generatrix of the compression roller 2a. For this purpose the hydraulic cylinder arrangement 63 is controlled by a device 65. The size of the gap between the grinding tray 3 and the compression roller 2a adjusts their speed when the grinding tray 3 is rotated and grinding material is present. A speed counter 66 can be provided for determining the speed of the compress on roller 2a.

The setting of the gap between the grinding tray and the compression rollers and therefore the speed of said compression rollers is adjusted as a function of the vibrating power of the rolling mill in such a way that the vibrating power or the vibrations assume a minimum value. A sensor is positioned on the mill at an appropriate point for determining the vibrations of the rolling mills. In the embodiment shown in FIG. 9 such a sensor in the form of a vibration pickup is coupled to the mill casing.

FIG. 9 shows the compression roller 2a directly facing the surface of the grinding tray, i.e. in the position in which the rocker 48 carrying the compression roller 2a is in engagement with the stop 56 via its support area 55. However, as stated hereinbefore, in operation a gap is set between the compression roller 2a and the grinding tray 3. For setting an optimum gap, i.e. that gap at which the speed of the compression roller 2a reaches a value where the measured rolling mill vibrations assume a minimum value, the starting point is a central gap height which, taking account of the height of the baffle rim or flange 68, is determined in the manner indicated hereinafter. The baffle flange 68 is placed all round the outer edge of the grinding tray 3 and has the height h, as can be gathered from the diagrammatic detail view of FIG. 10.

The height of the baffle flange 68 corresponds roughly to 0.1 to 0.2 times the diameter of the grinding roller 1a. The height of the gap between the surface of the grinding tray 3 and the facing generatrix 69 of the compression roller 2a is, in the presetting stage, roughly half the baffle flange height, i.e. h/2. Starting from the gap width h/2, there is an optimization of the gap or the speed of the compression roller by operating the hydraulic cylinder arrangement 63 via a control unit 65 and for checking purposes the speed can be read off by means of the speed counter 66 and compression roller speed optimization takes place whilst observing the rolling mill vibrations. The latter are determined by the sensor 67 and can then be minimized by the adjustable gap height or the speed of the compression rollers.

By means of the bearing lever 50 the compression roller 2a can be pivoted out from the working position of the compression roller over the grinding tray 3 shown in continuous line form into a waiting position, where the roller 2a is outside the mill casing, as indicated in FIG. 9 by a dot-dash representation of the support frame and compression roller. For this purpose the bearing lever 50 is articulated by means of a joint 68' to a hydraulic cylinder arrangement 69'.

A further hydraulic cylinder arrangement 70 is articulated by means of a joint 71 to the outer end of the rocker 44 carrying the grinding or working roller. By operating the arrangement 70 the grinding roller 1a can be transferred between the working position over the grinding tray 3 into a position in which the grinding roller 1a is located outside the rolling mill casing. The distance from the median longitudinal axis of the grinding roller 1a which, in the waiting position is located outside the casing, and the rotation axis of the grinding tray or to the median longitudinal axis of the rolling mill corresponds to the distance from the median longitudinal axis of the compression roller 2a in the waiting position from the axis 28. As a result, both roller types, namely the grinding rollers 1a,1b and the compression rollers 2a,2b ca be installed or maintained by the same hoisting unit 72 positioned above the mill and which is located on a not shown crane runway.

The articulation of the rollers 1b and 2b, not shown in FIG. 9, as well as the setting of the gap between the compression roller 2b and the grinding tray 3 take place in the same way as described hereinbefore relative to the rollers 1a and 2a.

Therefore an important inventive concept is the modular unit formed by the support frame 80, bearing lever 50, including the rocker 48 and compression roller 2a or 2b with the portions 57,58 and the hydraulic cylinder arrangement 63, which as a compact module can also be subsequently installed in different rolling mill sizes.

I claim:

1. An air flow rolling mill comprising a rotary grinding tray having a first rotation axis, at least one grinding roller for grinding material on a surface of said tray, and at least one precompression roller driven by frictional engagement with material on the tray to form a substantially uniform bed of material supplied to the grinding roller, the precompression roller having a second rotation axis inclined with respect to said surface and intersecting the first rotation axis substantially at said surface so as to produce substantially pure rolling movement of the precompression roller on the tray, said mill further comprising:

a sensor for determining vibrations of the rolling mill fitted to the rolling mill and means for adjusting the speed of the precompression roller to a value at which the measured vibrations of the rolling mill assume a minimum value, the means for adjusting the speed of the precompression roller having means for adjusting a gap between the surface of the grinding tray and the generatrix of the precompression roller facing said generatrix of the precompression roller, the means for adjusting the gap comprising a rocker carrying the precompression roller and means for pivoting the rocker.

2. A rolling mill as defined in claim 1 including plural grinding rollers angularly spaced around the tray and plural precompression rollers between the respective grinding rollers.

3. A rolling mill as defined in claim 2 wherein the precompression roller is smaller than the grinding roller.

4. A rolling mill as defined in claim 1 wherein the precompression roller has mounting means for supporting the precompression roller on said bed under its own weight.

5. A rolling mill as defined in claim 1 wherein the grinding roller has mounting means for resiliently urging the grinding roller towards said surface.

6. Air flow rolling mill according to claim 1 with a baffle flange provided all round the outer edge of the grinding tray and whose height roughly corresponds to 0.1 to 0.2 times the grinding roller diameter.

7. Air flow rolling mill according to claim 6 with means for presetting the gap between the precompression roller and the grinding tray to roughly half the baffle flange height.

8. Air flow rolling mill according to claim 7, wherein a precompression roller, the associated rocker and the means for pivoting the rocker in a support frame, which has a sealing off device with respect to the airflow rolling mill casing, are formed into an integrated module, which can be installed as a unit.

9. Air flow rolling mill according to claim 8, wherein the module is pivotably mounted between a working position, in which the precompression roller is positioned over the grinding tray, and a service position in which the precompression roller is located outside the rolling mill casing and wherein the support frame is detachably connected to the casing.

10. Air flow rolling mill according to claim 9 with a means for pivoting the grinding rollers between their working position over the grinding tray and a service position in which the grinding rollers are located outside the rolling mill casing, wherein the distance from the grinding rollers in the service position to the median longitudinal axis of the rolling mill is the same as the distance of the precompression roller in the service position from the median longitudinal axis.

11. Air flow rolling mill according to claim 9, wherein the rolling mill casing in the area in which the rocker carrying the precompression roller traverses the casing is constructed as a module part which can be brought into sealing engagement therewith and wherein a means for dustproof passage of the rocker through a recess in the module part is provided.

12. Air flow rolling mill according to claim 11, wherein the means for the dustproof passage of the rocker comprises a segment tightly connected thereto and a casing segment, which is tightly inserted in a module recess traversed by the rocker and is in engagement with the outer surface of the segment.

13. An air flow rolling mill comprising a rotary grinding tray having a first rotation axis, at least one grinding roller for grinding material on a surface of said tray, and at least one precompression roller driven by frictional engagement with material on the tray to form a substantially uniform bed of material supplied to the grinding roller, the precompression roller having a second rotation axis inclined with respect to said surface and intersecting the first rotation axis at a location spaced from said surface to produce a combined rolling and sliding movement of the precompression roller on the tray, said mill further comprising:
 a sensor for determining vibrations of the rolling mill fitted to the rolling mill and means for adjusting the speed of the precompression roller to a value at which the measured vibrations of the rolling mill assume a minimum value,
 the means for adjusting the speed of the precompression roller having means for adjusting a gap between the surface of the grinding tray and the generatrix of the precompression roller facing said generatrix of the precompression roller, the means for adjusting the gap comprising a rocker carrying the precompression roller and means for pivoting the rocker.

14. A rolling mill as defined in claim 13 including plural grinding rollers angularly spaced around the tray and plural precompression rollers between the respective grinding rollers.

15. A rolling mill as defined in claim 13 wherein the precompression roller has mounting means for supporting the precompression roller on said bed under its own weight.

16. A rolling mill as defined in claim 13 wherein the grinding roller has mounting means for resiliently urging the grinding roller towards said surface.

17. An air flow rolling mill comprising a rotary grinding tray having a first rotation axis, at least one grinding roller for grinding material on a surface of said tray, and at least one precompression roller driven by frictional engagement with material on the tray to form a substantially uniform bed of material supplied to the grinding roller, the precompression roller having a second rotation axis inclined with respect to said surface and intersecting the first rotation axis substantially at said surface so as to produce substantially pure rolling movement of the precompression roller on the tray, said mill further comprising:
 a sensor for determining vibrations of the rolling mill fitted to the rolling mill and means for adjusting the speed of the precompression roller to a value at which the measured vibrations of the rolling mill assume a minimum value,
 the means for adjusting the speed of the precompression roller having means for adjusting a gap between the surface of the grinding tray and the generatrix of the precompression roller facing said generatrix of the precompression roller, the means for adjusting the gap comprising a rocker carrying the precompression roller and means for pivoting the rocker, wherein the precompression roller, the associated rocker and the means for pivoting the rocker in a support frame, which has a sealing off means with respect to the airflow rolling mill casing, are formed into an integrated module, which can be installed as a unit, and which is pivotable mounted between a working position, in which the precompression roller is positioned over the grinding tray, and a service position in which the precompression roller is located outside the rolling mill casing and wherein the support frame is detachably connected to the casing.

* * * * *